US008538431B2

(12) United States Patent
Obata et al.

(10) Patent No.: US 8,538,431 B2
(45) Date of Patent: Sep. 17, 2013

(54) RADIO CHANNEL CONTROLLER AND RADIO CHANNEL CONTROLLING METHOD

(75) Inventors: Kazunori Obata, Yokosuka (JP); Naoaki Harada, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 652 days.

(21) Appl. No.: 12/266,076

(22) Filed: Nov. 6, 2008

(65) Prior Publication Data

US 2009/0117900 A1 May 7, 2009

(30) Foreign Application Priority Data

Nov. 7, 2007 (JP) ................................. 2007-289348

(51) Int. Cl.
*H04W 4/00* (2009.01)
*H04W 36/00* (2009.01)
*H04L 12/28* (2006.01)
*H04L 12/56* (2006.01)

(52) U.S. Cl.
USPC ........ 455/436; 455/432.1; 455/434; 370/332; 370/329; 370/395.2; 370/331

(58) Field of Classification Search
USPC .......... 455/432.1, 435.1, 435.2, 456.1, 456.4, 455/456.5, 436; 370/331, 332, 333; 379/60
See application file for complete search history.

(56) References Cited

U.S. PATENT DOCUMENTS

| 5,862,480 | A | 1/1999 | Wild et al. | |
|---|---|---|---|---|
| 7,194,273 | B2 * | 3/2007 | Vaudreuil | 455/456.3 |
| 7,277,705 | B2 * | 10/2007 | Casaccia et al. | 455/435.1 |
| 7,925,259 | B2 * | 4/2011 | Nylander et al. | 455/434 |
| 2002/0160777 | A1 | 10/2002 | Takao et al. | |
| 2004/0157600 | A1 * | 8/2004 | Stumpert et al. | 455/432.1 |
| 2007/0183427 | A1 * | 8/2007 | Nylander et al. | 370/395.2 |
| 2009/0052399 | A1 * | 2/2009 | Silver et al. | 370/331 |
| 2009/0086672 | A1 * | 4/2009 | Gholmieh et al. | 370/329 |

FOREIGN PATENT DOCUMENTS

| EP | 1 626 603 A1 | 2/2006 |
|---|---|---|
| JP | 10-327451 A | 12/1998 |
| JP | 2000-232669 A | 8/2000 |
| JP | 2001-251658 A | 9/2001 |
| JP | 2002-27519 A | 1/2002 |
| JP | 2003-78938 A | 3/2003 |
| JP | 2006-5502 A | 1/2006 |
| JP | 2007-13463 A | 1/2007 |
| JP | 2007-235495 A | 9/2007 |

OTHER PUBLICATIONS

Japanese Office Action (w/Translation), dated Oct. 11, 2011, 5 pages.
European Office Action, dated Apr. 22, 2013, 6 pages.

* cited by examiner

*Primary Examiner* — Kent Chang
*Assistant Examiner* — Nathan Brittingham
(74) *Attorney, Agent, or Firm* — Crowell & Moring LLP

(57) ABSTRACT

Even when a general user's mobile station in communication enters a use-prohibited cell, the use of the use-prohibited cell is prevented while the communication is being maintained. Regarding a mobile station 100 that enters an area of a cell C12 under handover restriction, the connection utilizing the use-prohibited cell is prohibited and handover of the mobile station is performed to an effectively-operating cell C22 covering an area including the current position of the mobile station within the use-prohibited cell and having another frequency. Alternatively, the handover is performed to a base station of an effectively-operating cell C32 belonging to another mobile communication system.

4 Claims, 9 Drawing Sheets

RADIO CHANNEL CONTROLLER AND RADIO CHANNEL CONTROLLING METHOD

BACKGROUND OF THE INVENTION

1. Field of the Invention

The present invention relates to a radio channel controller and a radio channel controlling method, which are applied to a mobile communication system.

2. Description of the Related Art

In a mobile communication system, restriction on handover or "handover restriction" may sometimes be set for a base transceiver station or for a cell as an area in which the base transceiver station provides a communication service, in order to install a new base transceiver station and perform its accompanying wave measurement and adjustment or to carry out regular or occasional maintenance operation.

Telephone call is allowed only by a mobile communication carrier or by a mobile station for a particular operator serving under the mobile communication carrier, in the cell to which the handover restriction is set. Thereby, confirmation on normality of the telephone call, confirmation on operational parameters, and the like are performed.

General users are not allowed to establish communication by using the cell to which the handover restriction is set.

Herein, the cell in which the handover is being restricted and thus its usage is prohibited may hereinafter be referred to as "use-prohibited cell".

In a mobile communication system in which the same frequency range can be used for all of the base transceiver stations, such as WCDMA (Wideband Code Division Multiple Access), OFDMA (Orthogonal Frequency Division Multiple Access) and the like, radio waves generated by the base transceiver station under handover restriction become sources of interference. Thus, restriction on construction or "construction restriction" is generally set for the base transceiver station under handover restriction as a cell for construction or maintenance, as far as announcement information and handling in a control station are concerned, although such a base transceiver station under handover restriction is managed as one of the base transceiver stations within a commercial system, as with general base transceiver stations.

By operating as described above, a mobile station currently in a state of waiting for a call is not allowed to wait a call in the cell for construction or maintenance, so the mobile station is prompted to receive a call in another cell to which the handover restriction is not set.

In addition, since a mobile station in communication takes the base transceiver station under handover restriction as a candidate for communication, namely handover connection, there are some cases in which the mobile station issues a handover request. However, it is general not to execute a process for the handover request to the mobile station, because the base transceiver station that has received the handover request is a base transceiver station under construction. As a result, the communication state is generally allowed to be continued without a handover.

However, when the mobile station further moves and enters deeply in a cell in which the base transceiver station under handover restriction covers, there may be some cases where the quality in communication deteriorates to cause consequent disconnection of the communication.

JP 2000-232669 A proposes a technique, by which the handover restriction is performed to a particular base transceiver station to ensure the maintenance.

JP 2000-232669 A discloses the technique, which specifies a base transceiver station for a destination cell to which the mobile station moves due to handover, on the basis of a radio state periodical report notified from a mobile station to a base transceiver station, so as to ensure that the base transceiver station under handover restriction to be in a maintainable state.

The base transceiver station for the moving destination as a result of the handover is specified based on the radio state periodically reported from the mobile station. JP 2000-232669 A discloses that it is possible to stop communication with the base transceiver station under handover restriction without having effect on a mobile communication system, and to keep the base transceiver station in a maintainable state with certainty.

In addition, various handover controlling methods have been proposed to maintain qualities in communication. For example, there has been proposed a handover controlling method which permits the handover of a mobile station in communication with a base transceiver station in a congestion state in order to ensure the qualities of communication services desired by a user, when the base transceiver station is in a congestion state (see JP 2001-251658 A).

According to the proposal of JP 2001-251658 A, a mobile communication system is established by providing a base transceiver station having the strongest electrical field intensity and a selector which selects a mobile station having observed the base transceiver station, excluding a combination of a base transceiver station currently in communication with a mobile station, as a mobile station to be an object of handover and a base transceiver station to be in communication with the mobile station.

Furthermore, there has been a technique which aims to decrease frequency of handover, thereby enhancing communication qualities and decreasing power consumption.

According to the proposal of JP 2002-27519 A, order of priority is given to multiple base transceiver stations to be a candidate of a handover destination. The reception quality is confirmed in descending order of the priority as to multiple candidate base transceiver stations. If there is any base transceiver station satisfying a predetermined condition, such a base transceiver station is determined as the handover destination.

Moreover, there has been proposed a technique, which prevents calls from mobile stations located in a cell area of a base transceiver station from being disconnected even on an occurrence of a fault in the base transceiver station.

JP 2003-78938 A discloses a technique in which a base station controller, when any of base transceiver stations under control becomes faulty, instructs all of the base transceiver stations which manage peripheral cells adjacent to the cell of the faulty base transceiver station to increase downlink transmission power. The base station controller then transmits an instruction of handover to a mobile station whose call is connected to the faulty base transceiver station. The base station controller further instructs the faulty base transceiver station to restart when the handover of the mobile station having been completed is confirmed. When the faulty base transceiver station having been recovered to the normal operation state is confirmed, the base station controller instructs the base transceiver stations which manage the peripheral cells to restore the transmission power to an original state.

There has been proposed another technique which prevents a handover request from being given to a cell with a high load (see JP 2006-5502 A).

According to the proposal of JP 2006-5502 A, a control station transmits a state of the load to a corresponding base transceiver station whenever the load of the cell is updated.

The base transceiver station transfers the state of the load to a mobile station. The mobile station extracts a cell as a candidate for handover destination, on the basis of a reception level of a signal transmitted from the base transceiver station and the state of the load.

Furthermore, there has been proposed a technique which aims to perform connection to an optimal base transceiver station according to a change in circumstances.

According to the proposal of JP 2007-13463 A, an upper station manages one or more base transceiver stations to be a candidate for handover destination and its relating mobile station. The quality of a radio channel between the mobile station and the base transceiver station to be a candidate for handover destination is measured, and then the handover is executed at a timing based on a result of the measurement.

As described above, JP 2000-232669 A discloses the technique whose main purpose is to surely prevent the handover connection to the cell of the base transceiver station under handover restriction so that the implementation of the maintenance and on the like is not interfered.

In JP 2000-232669 A, however, there is no recognition on a technical problem from a viewpoint of allowing a mobile station, being used by a general user for telephone call, to maintain the telephone call surely, without using the use-prohibited cell under handover restriction. Therefore, JP2000-232669A fails to propose a solution for the problem.

In addition, the other techniques discussed above disclose techniques of appropriately performing the handover under the various conditions. However, none of the above-described techniques has proposed a radio channel controlling method, whereby the communication in the mobile station of a general user is maintained even when the mobile station of the general user encounters the use-prohibited cell under handover restriction.

SUMMARY OF THE INVENTION

The present invention has been made in view of the above circumstance and has an object to provide a radio channel controller and a radio channel controlling method, capable of maintaining communication while avoiding a use-prohibited cell to be used by a general user's mobile station in communication, even when the general user's mobile station in communication enters the use-prohibited cell in which handover is restricted.

To solve the above problems, according to one aspect of the present invention, there is provided a radio channel controller, comprising: a signal analyzing section which analyzes a signal received from an external node and which detects a moving request of moving from a moving source cell where a mobile station is currently positioned to a moving destination cell as a cell located in a destination of moving of the mobile station; a discrimination section which discriminates whether or not the moving destination cell is a use-prohibited cell in which the use of the cell is prohibited, based on the moving request detected by the signal analyzing section; and an instructing section which transmits to a corresponding destination of transmission an instruction which causes the mobile station to use an effectively-operating cell which covers an area including the current position of the mobile station, when the discrimination section discriminates that the moving destination cell is the use-prohibited cell.

Specifically, in the above radio channel controller, the signal analyzing section analyzes the signal that has been received from the external node such as a user's mobile station, and detects the received signal when there is a moving request from the moving source cell where the mobile station is currently positioned to the moving destination cell as a cell located in the moving destination of the mobile station.

The discrimination section discriminates whether or not the moving destination cell specified by information on the moving request detected by the analyzing section is the use-prohibited cell in which its use is prohibited.

When the discrimination section discriminates that the moving destination cell is the use-prohibited cell, the instructing section transmits the instruction for utilizing the effectively-operating cell, which covers the area including the current position of the mobile station to the corresponding destination of the transmission. Thereby, the use of the use-prohibited cell is avoided and the connection utilizing the effectively-operation cell is enabled.

In the above radio channel controller, the instructing section may select, as the effectively-operating cell, a cell having another frequency different from a frequency of the use-prohibited cell and covering the area including the current position of the mobile station within the use-prohibited cell, and the instructing section may transmit to the corresponding destination of the transmission the instruction which causes the mobile station to use the another frequency cell as the effectively-operating cell.

According to the above radio channel controller, the connection utilizing the different frequency cell is established as the effectively-operating cell, which has the frequency different from that of the use-prohibited cell, and which covers the area including the current position within the use-prohibited cell of the mobile station. Thereby, the communication is maintained while the use of the use-prohibited cell is avoided.

In the above radio channel controller, the instructing section may select, as the effectively-operating cell, another cell which belongs to a mobile communication system different from a mobile communication system of the use-prohibited cell and which covers the area including the current position of the mobile station within the use-prohibited cell, and the instructing section may transmit to the corresponding destination of the transmission the instruction which causes the mobile station to use the another cell as the effectively-operating cell.

According to the above radio channel controller, the connection utilizing the another type cell, as the effectively-operating cell, which belongs to the mobile communication type different from that of the use-prohibited cell, and which covers the area including the current position within the use-prohibited cell of the mobile station, is established. Thereby, the communication is maintained while the use of the use-prohibited cell is avoided.

According to another aspect of the present invention, there is provided a radio channel controlling method, comprising: prohibiting a connection utilizing a use-prohibited cell in which the use of the cell is prohibited, when the mobile station enters an area of the use-prohibited cell that is a cell of a moving destination from a moving source cell where the mobile station is currently positioned; and establishing a connection utilizing an effectively-operating cell which covers an area including the current position of the mobile station within the use-prohibited cell.

According to the present invention, there are provided a radio channel controller and a radio channel controlling method, with respect to the mobile station which has moved into the area of the use-prohibited cell in which its use is prohibited, the connection to the use-prohibited cell is prohibited. In addition, the connection utilizing the effectively-operating cell covering the area including the current position of the mobile station within the use-prohibited cell is established. Thereby, the use of the use-prohibited cell is avoided, while the communication is being maintained.

DETAILED DESCRIPTION OF THE PREFERRED EMBODIMENTS

Figure 1:
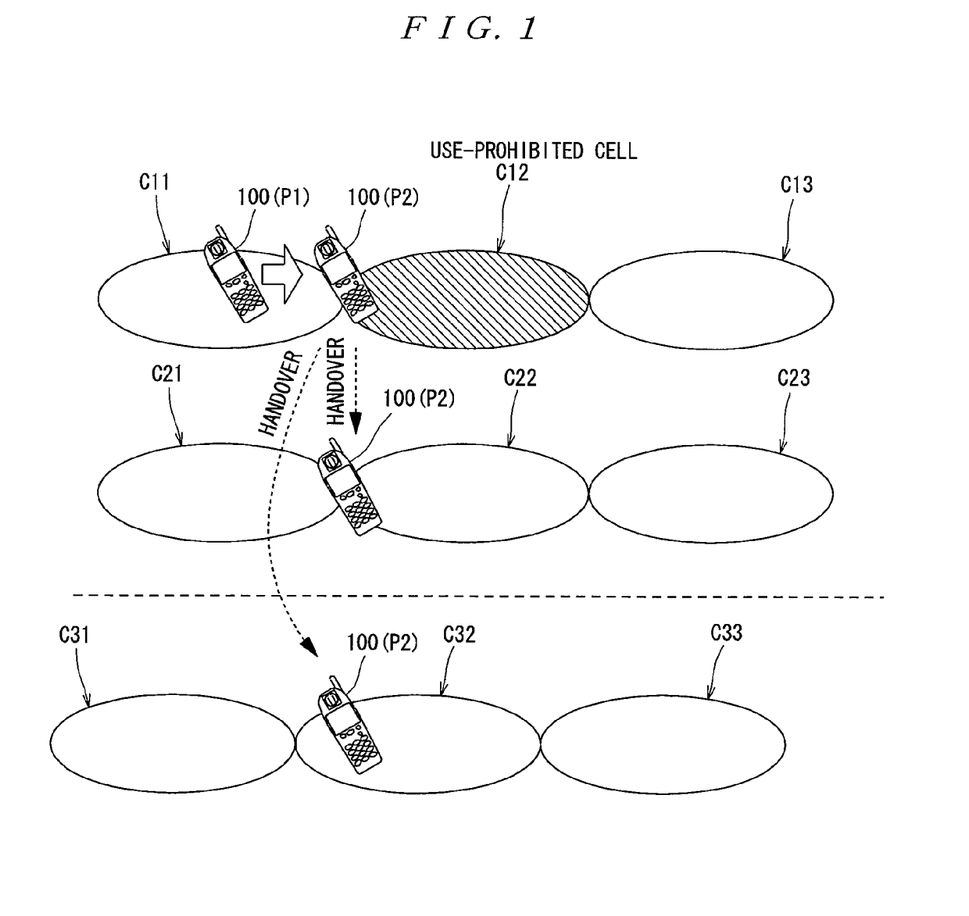
FIG. 1 illustrates a concept according to one embodiment of the present invention.

Embodiments of the present invention will now be described with reference to the accompanying drawings.
Brief Overview of Concept of an Embodiment of the Invention FIG. 1 illustrates a concept according to one embodiment of the present invention. In FIG. 1, reference numerals C1, C12, and C13 denote cells which are operated by a given constant frequency F1 in a mobile communication system. The cells C11, C12, and C13 are configured to have positional relationships in which the cells C11, C12, and C13 are adjacently connected mutually, as illustrated in the drawing.

Reference numerals C21, C22, and C23 denote cells which are operated by a frequency F2, which is different from the frequency F1. The cells C21, C22, and C23 are also configured to have positional relationships in which the cells C21, C22, and C23 are adjacently connected mutually, as illustrated in the drawing.

The operation frequency of the cells C11, C12 and C13 and that of the cells C21, C22 and C23 are different from each other. Those cells, however, belong to the same mobile communication system, such as a third generation (3G) mobile communication systems, for example.

On the other hand, cells C31, C32 and C33 belong to another mobile communication system such as a second generation (2G) mobile communication systems or a long-term evolution (LTE) system that is an extended one of the 3G mobile communication systems, both of which are different from the system to which the cells C11, C12, C13, C21, C22 and C23 belong.

In the present embodiment, for example, the cell C12 among the above cells is assumed to be covered by a base transceiver station under handover restriction as a so-called "cell for construction or maintenance". As described above, the cell in which the handover is restricted and thus its usage is prohibited may be referred to as "use-prohibited cell".

A mobile station 100 of a user is assumed to maintain communication, and has moved from an original position P1 to a position P2. The position P2 is where the mobile station 100 has begun to enter an area of the use-prohibited cell C12. In a conventional technique relating to handover control, the handover of the mobile station 100 to the use-prohibited cell C12 is not performed at the position P2, and thus setting of calling is maintained by the cell C11.

When the mobile station 100 further moves and enters deeply in the use-prohibited cell C12, the quality of the communication may be deteriorated and the communication may be consequently disconnected in a case in which no particular measure has been taken.

According to one embodiment of the present invention, the connection to the use-prohibited cell C12 is prohibited, when the mobile station 100 enters the area of the use-prohibited cell C12 under handover restriction. In addition, the connection is established with a cell which operates effectively or an "effectively-operating cell" and which covers an area including a current position of the mobile station 100 within the use-prohibited cell C12, so that the communication is maintained.

The connection of the mobile station 100 in such a case may be established as a handover to a base station which manages the effectively-operating cell, according to one embodiment of the present invention.

In the mobile communication system illustrated in FIG. 1, an effectively-operating cell corresponding to the use-prohibited cell C12 is the cell C22 operated by the frequency F2, which is different from the operation frequency F1 of the use-prohibited cell C12. According to one embodiment of the present invention, the connection utilizing the cell C22 having a different frequency is established so as to maintain the communication.

In addition, another effectively-operating cell corresponding to the use-prohibited cell C12 (of, for example, 3G mobile communication system) is the cell C32 (of, for example, 2G mobile communication system or LTE system). According to another embodiment of the present invention, the connection utilizing the cell C32 of a different communication system is established so as to maintain the communication.

Figure 2:
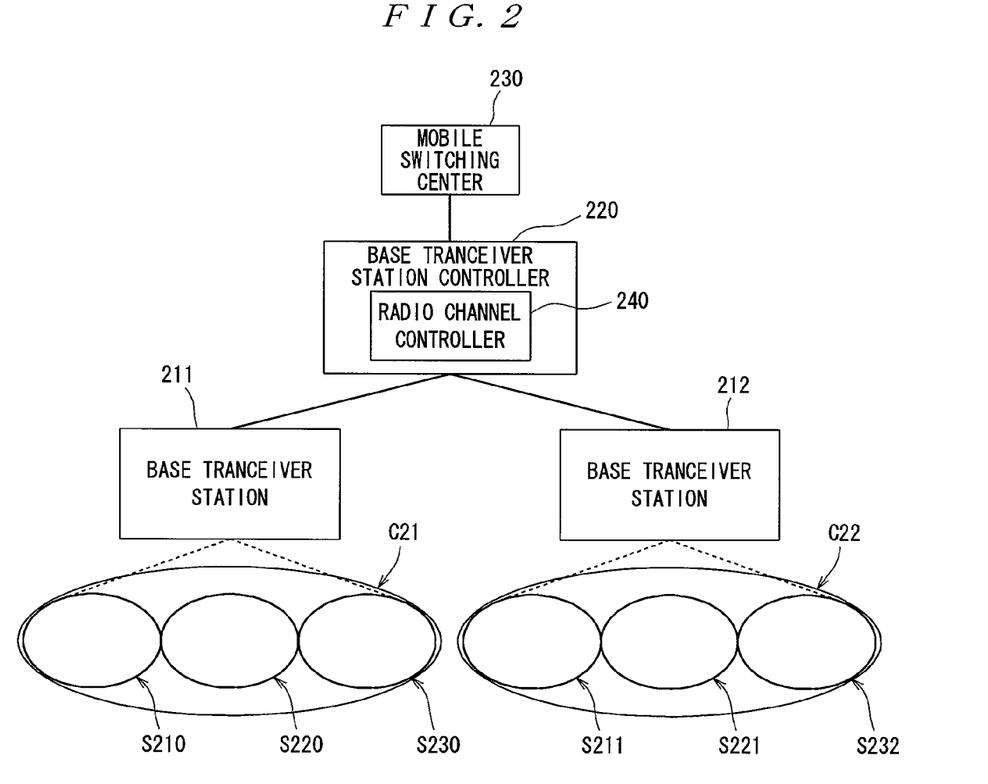
FIG. 2 illustrates a configuration of a mobile communication system to which the present invention is applied.

Configuration of a Mobile Communication System with 3G System to which the Present Invention is Applied FIG. 2 illustrates a configuration of a mobile communication system to which the present invention is applied. The mobile communication system illustrated in FIG. 2 complies with the 3G system.

The communication of mobile stations within an area of the cell C21 is managed by a base transceiver station 211, which defines the cell C21 including multiple sectors S210, S220 and S230, as a service area. Similarly, the communication of mobile stations within an area of the cell C22 is managed by a base transceiver station 212, which defines the cell C22 which including multiple sectors S211, S221 and S231, as a service area.

In the mobile communication system illustrated in FIG. 2, there is provided a base transceiver station controller 220, which provides overall control of the base transceiver stations 211 and 212 (two stations are shown in FIG. 2, as an example) The base transceiver station controller 220 is connected to a backbone network through a mobile switching center 230 being a further upper node thereof.

In the above configuration, in particular, the base transceiver station controller 220 includes a radio channel controller 240 according to one embodiment of the present invention. This is a different point from this kind of a conventional mobile communication system.

As will be described later in detail, when a user's mobile station requests a connection utilizing the use-prohibited cell, the radio channel controller 240, prohibits such a connection according to the request utilizing the use-prohibited cell, and performs connection control for establishing such a connection utilizing the effectively-operating cell that has been described above with reference to FIG. 1.

Figure 3:
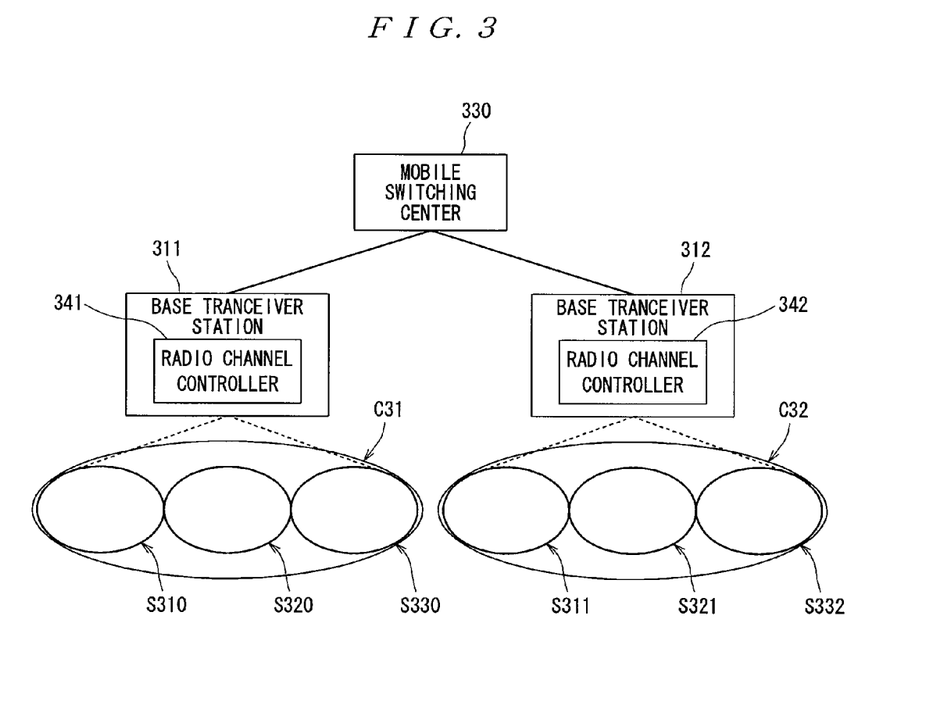
FIG. 3 illustrates a configuration of another mobile communication system to which the present invention is applied.

Configuration of Another Mobile Communication System with LTE System to which the Present Invention is Applied FIG. 3 illustrates a configuration of another mobile communication system to which one embodiment of the present invention is applied. The mobile communication system illustrated in FIG. 3 complies with the LTE system.

The communication of mobile stations within an area of the cell C31 is managed by a base transceiver station 311, which defines the cell C31 including multiple sectors S310, S320 and S330, as a service area. Similarly, the communication of mobile stations within an area of the cell C32 is managed by a base transceiver station 312, which defines the cell C32 including multiple sectors S311, S321 and S331, as a service area.

Two or more base transceiver stations 311 and 312 (two stations are shown in FIG. 2, as an example) are connected to a backbone network through a mobile switching center 330 being a further upper node thereof.

In the above configuration, radio channel controllers 341 and 342 according to one embodiment of the present invention are provided in the base transceiver stations 311 and 312, respectively. This is different point from this kind of the conventional LTE system.

The structures of the radio channel controllers 341 and 342 in terms of its functional blocks are similar to that of the radio channel controller 240, as will be described later in detail with reference to FIG. 4.

In the mobile communication system illustrated in FIG. 3, when the user's mobile station requests a connection utilizing the use-prohibited cell, the radio channel controller 341 provided in the base transceiver station 311 and the radio channel controller 342 provided in the base transceiver station 312 prohibit the connection utilizing the use-prohibited cell, and establishes a connection control for handover to a base station of the effectively-operating cell, as described above with reference to FIG. 1.

Configuration of Radio Channel Controller

Figure 4:
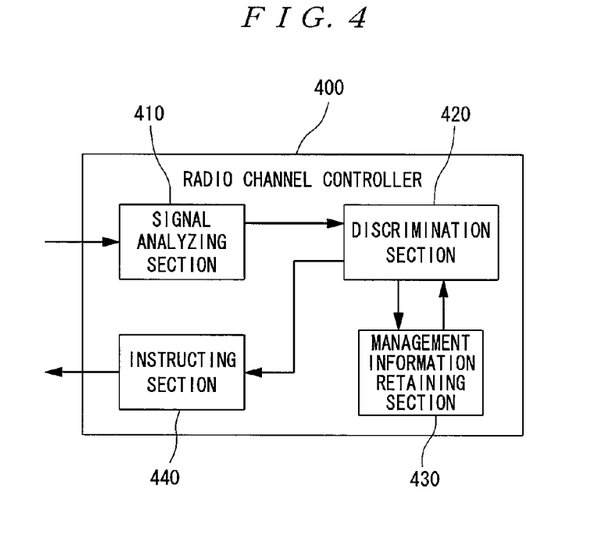
FIG. 4 is a functional block diagram illustrating a radio channel controller to be applied to the mobile communication systems illustrated in FIG. 2 and FIG. 3.

FIG. 4 is a functional block diagram illustrating a radio channel controller according to one embodiment of the present invention, which is applied to the mobile communication systems illustrated in FIG. 2 and FIG. 3.

In FIG. 4, a reference numeral 400 is collectively given to the radio channel controller 240 illustrated in FIG. 2 and the radio channel controllers 341 and 342 illustrated in FIG. 3.

The radio channel controller 400 includes a signal analyzing section 410, a discrimination section 420, and an instructing section 440. The signal analyzing section 410 analyzes a signal received from an external node such as a user's mobile station, and then detects from the received signal a request of moving or "moving request" from a moving source cell in which the mobile station is currently positioned to a moving destination cell to which the mobile station is moving. The discrimination section 420 receives the moving request detected by the signal analyzing section 410, arbitrarily refers to information retained in a management information retaining section 430 which retains management information including cell information representing a use-prohibited cell and an effectively-operating cell, and then discriminates whether or not the moving destination cell is the use-prohibited cell the use of which is prohibited, on the basis of the received moving request. The instructing section 440 transmits to a corresponding destination of transmission an instruction for using the effectively-operating cell which covers an area including the current position of the mobile station, when the discrimination section 420 discriminates that the moving destination cell is a use-prohibited cell.

In other words, the signal analyzing section 410 analyzes the signal received from the external node such as a user's mobile station, and then detects the received signal, when the received signal indicates the moving request to the moving destination cell and the moving request could be information on a handover request or the like.

The discrimination section 420 identifies the cell of the moving destination specified by the moving request such as the information on the handover request or the like that has been detected by the signal analyzing section 410, and then prohibits the connection utilizing the use-prohibited cell on the basis of a result of the identification, when the moving destination corresponds to a base station of the use-prohibited cell under handover restriction.

The discrimination section 420 further generates information on instruction for establishing the connection described above utilizing the effectively-operating cell which covers the area including the current position of the mobile station within the use-prohibited cell.

The information on instruction or "instruction information" may include information on the connection control for performing the handover to the base station managing the effectively-operating cell.

The management information retaining section 430 retains the management information which includes the cell information indicative of the use-prohibited cell and the effectively-operating cell. The discrimination section 420 refers to the management information in the course of generating the instruction information described above. It is therefore possible to determine whether or not the destination of the handover request specified by the information on the handover request that has been detected by the signal analyzing section 410 corresponds to the use-prohibited cell. It is also possible to determine which one of the effectively-operating cells meets the current position of the mobile station.

The information retained by the management information retaining section 430 is information normally accumulated in a database by an operator of a mobile communication carrier administrating a mobile communication system, as "system data" or "station data", which is updated as necessary. The cell information indicative of the use-prohibited cell and the effectively-operating cell and the like may also be updated as necessary to the latest information such that a state matching an actual situation of the system should be kept.

The instructing section 440 notifies the information on the connection control, generated by the discrimination section 420, to a corresponding destination of notification to which the connection utilizing the effectively-operating cell is to be established.

In the mobile communication system illustrated in FIG. 2, the "corresponding destination of notification" is the base transceiver stations 211 and 212 being nodes lower than the base transceiver station controller 220 provided with the radio channel controller 240 according to one embodiment of the present invention.

Alternatively, in the mobile communication system illustrated in FIG. 3, the "corresponding destination of notification" is another part (a functional part which manages a different cell) within the base transceiver station 311 provided with the radio channel controller 341 according to one embodiment of the present invention. Further alternatively, the "corresponding destination of notification" is the base transceiver station 312 provided with the radio channel controller 342 according to one embodiment of the present invention. That is to say, in the latter case, the radio channel controller 240 notifies the information on the connection control to another station on the same level of management.

The base transceiver station that has received the notification as described above responds to the notification (connection control information), whereby the handover to the base station of the effectively-operating cell is enabled.

Figure 5:
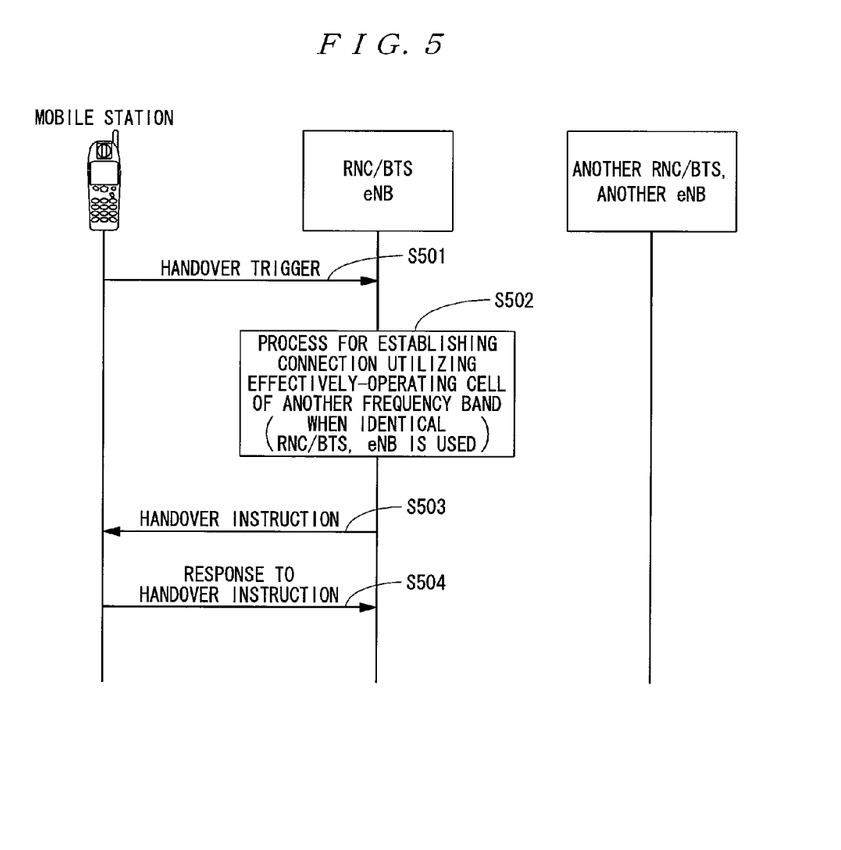
FIG. 5 is a sequence diagram illustrating the operation on radio channel control in a mobile communication system to which the present invention is applied.

Operation on Radio channel control in A Mobile Communication System to which the Present Invention is Applied FIG. 5 is a sequence diagram illustrating the operation on radio channel control in a mobile communication system to which one embodiment of the present invention is applied.

A sequence illustrated by way of example in FIG. 5 shows the radio channel control which prohibits the connection utilizing the use-prohibited cell and guides the mobile station to the connection to use the effectively-operating cell having a frequency different from that of the use-prohibited cell.

The example illustrated in FIG. 5 illustrates a case in which, in particular, the effectively-operating cell is managed by a functional part different from a functional part which manages the use-prohibited cell in the same base transceiver station controller or in the same base transceiver station.

In the drawing, "RNC/BTS, eNB" represents elements or devices including the radio channel controller according to one embodiment of the present invention, in a single block by focusing attention on its functions. The block "RNC/BTS, eNB" corresponds to the base transceiver station controller 220 illustrated in FIG. 2 in the 3G mobile communication system and the base transceiver stations 311 and 312 illustrated in FIG. 3 in the LTE system.

"RNC/BTS, eNB" is collectively represented to simplify the sequence diagram, whereas RNC stands for Radio Network Controller which is a base transceiver station controller, and BTS stands for Base Transceiver Station. It is to be noted that "RNC/BTS" does not mean that there is a device named "RNC/BTS".

In addition, "eNB" is an abbreviation of Evolved Node B, which corresponds to the base transceiver station of the LTE system.

When a moving request trigger is issued from a user's mobile station to the "RNC/BTS, eNB" (Step S501), the "RNC/BTS, eNB" (its radio channel controller) controls causing of the user's mobile station to use a different frequency cell, as the effectively-operating cell, which has a frequency different from that of a use-prohibited cell and which covers the area including the current position within the use-prohibited cell of the mobile station (Step S502).

In the example illustrated in FIG. 5, the above-described effectively-operating cell is also managed by the functional part different from the functional part which manages the use-prohibited cell in an identical "RNC/BTS, eNB".

Accordingly, subsequent to Step S502, the instruction to use the above-described effectively-operating cell is sent from the "RNC/BTS, eNB" to the mobile station (Step S503).

Thereafter, in response thereto, the mobile station returns a response of the received instruction to use the effectively-operating cell to the "RNC/BTS, eNB" (Step S504).

Thereby, the connection utilizing the use-prohibited cell is prevented, and the connection utilizing the effectively-operating cell is achieved.

Figure 6:
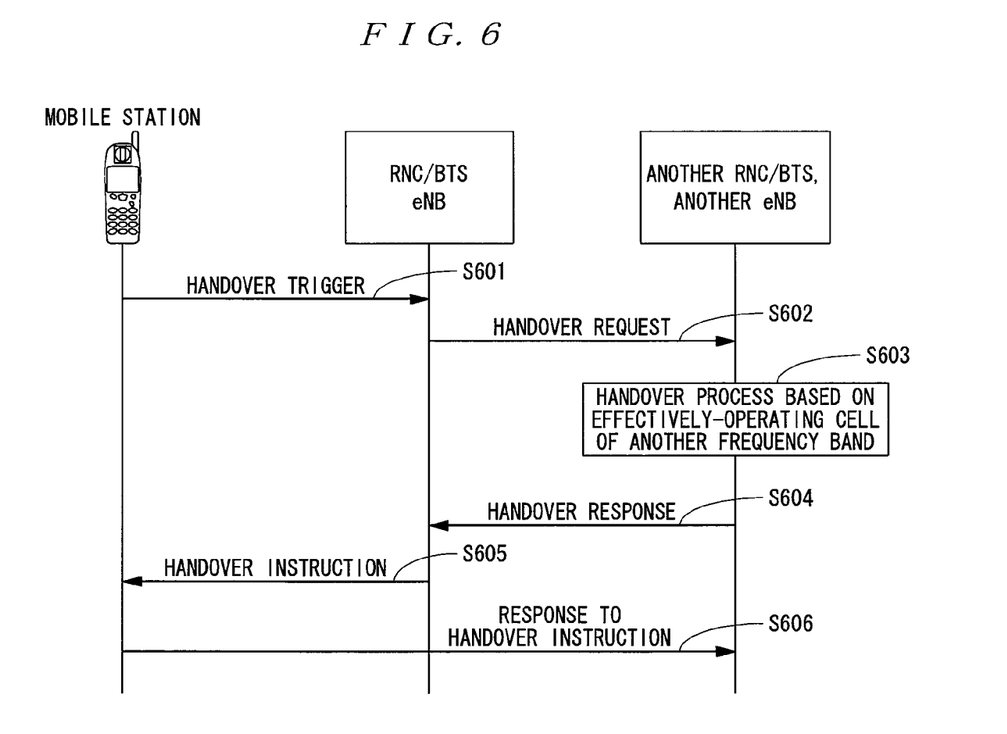
FIG. 6 is a sequence diagram illustrating the operation on radio channel control in another mobile communication system to which the present invention is applied.

Operation on Radio Channel Control in Another Mobile Communication System to which the Present Invention is Applied FIG. 6 is a sequence diagram illustrating the operation on radio channel control in another mobile communication system to which the present invention is applied.

The sequence illustrated by way of example in FIG. 6 is similar to the radio channel control that has been described above with reference to FIG. 5, in that the connection utilizing the use-prohibited cell is prohibited and the mobile station is guided to the connection utilizing the effectively-operating cell having the frequency different from that of the use-prohibited cell.

However, the example of FIG. 6 illustrates a case in which, in particular, the effectively-operating cell is managed by a base transceiver station controller or a base transceiver station, which is different from a base transceiver station controller or a base transceiver station which manages the use-prohibited cell.

Referring to FIG. 6, the meaning of "RNC/BTS, eNB" is same with that of the example illustrated in FIG. 5.

When a handover trigger is issued from the user's mobile station to the "RNC/BTS, eNB" (Step S601), the "RNC/BTS" (or its radio channel controller) discriminates whether or not the destination of the handover request of the handover trigger corresponds to the base station of the use-prohibited cell under handover restriction.

When this discrimination result corresponds to the use-prohibited cell, the "RNC/BTS" (or its radio channel controller) prohibits the connection to use the use-prohibited cell according to the request, and generates the information on the connection control (instruction information), for carrying out the handover to the base station of the effectively-operating cell covering the area which includes the current position of the mobile station within the area of the use-prohibited cell.

As described above, in FIG. 6, such an effectively-operating cell is managed by "another RNC/BTS, another eNB".

Accordingly, the "RNC/BTS, eNB" (or its radio channel controller) issues a handover request to the "another RNC/BTS, another eNB" (Step S602).

The "another RNC/BTS, another eNB" that has received the handover request in Step S602 controls the handover to a base transceiver station of a cell having another frequency, as the effectively-operating cell. The cell having another frequency has a frequency different from that of the use-prohibited cell, and covers the area including the current position within the use-prohibited cell of the mobile station (Step S603).

In the example illustrated in FIG. 6, the effectively-operating cell is managed by the "another RNC/BTS, another eNB".

Accordingly, subsequent to Step S603, a handover response is returned from the "another RNC/BTS, another eNB" to the "RNC/BTS, eNB" (Step S604). Then, the "RNC/BTS, eNB" issues a handover instruction to the mobile station (Step S605).

The mobile station that has received the handover instruction in Step S605 returns a response to the handover instruction to the "another RNC/BTS, another eNB" (Step S606).

Thereby, the connection utilizing the use-prohibited cell is prevented and the connection utilizing the effectively-operating cell is achieved.

Another Frequency Band According To Embodiments of the Present Invention

The effectively-operating cell of another frequency band according to embodiments of the present invention has been described with reference to FIG. 5 and FIG. 6. Hereinafter, specific examples will be described.

In a mobile communication system, frequency bands, for example, band I, band II, band III, and so forth to be applied to the system are defined. An existing system includes 2 GHz band (I), 800 MHz ban d(IV), and 1.7 GHz band (IX). Each of the bands is further segmented into every 5 MHz band. For example, 2 GHz band includes a bandwidth of 20 MHz, and four frequency bands, each having 5 MHz, are managed and controlled.

The effectively-operating cell having the "another frequency band" that has been described above with reference to FIGS. 5 and 6 corresponds to, for example, remaining three cells having 5 MHz bandwidths, respectively, relative to a cell having 5 MHz bandwidth in the 2 GHz band, a cell having 800 MHz bandwidth, and a cell having 1.7 GHz bandwidth.

The examples that have been described with reference to FIGS. 5 and 6 are specific ones of a further generalized technical concept according to one embodiment of the present invention, in which the use of the effectively-operating cell having a frequency different from that of a use-prohibited cell. The technical concept according to one embodiment of the present invention is based on the premise that the use-prohibited cell and the effectively-operating cell are both applied to the same mobile communication system. This system may be, for example but not limited to, 3G mobile communication system, the LTE system, and other suitable systems.

Figure 7:
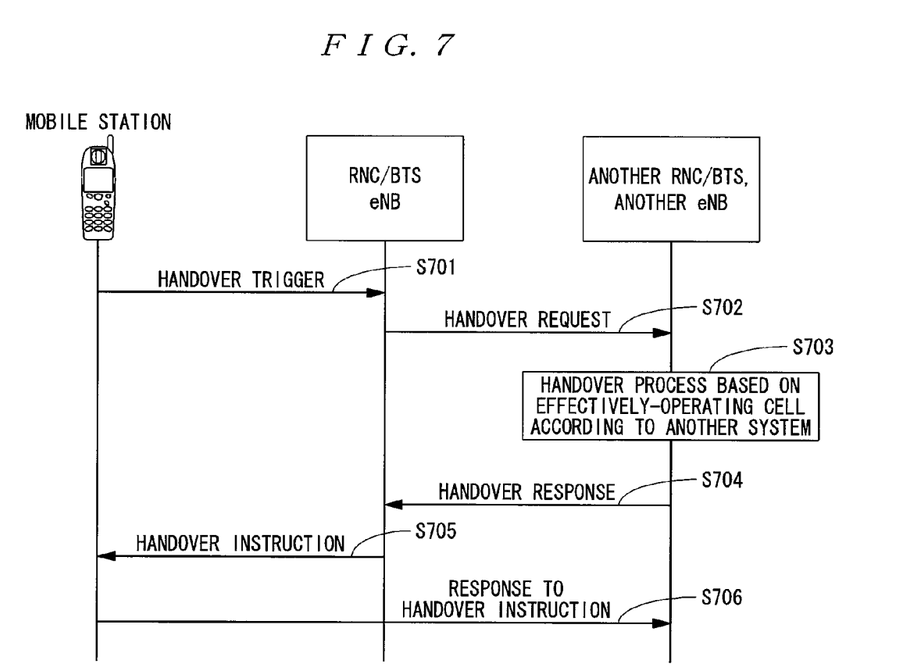
FIG. 7 is a sequence diagram illustrating the operation on radio channel control in yet another mobile communication system to which the present invention is applied.

Operation on Radio Channel Control in Yet Another Mobile Communication System to which the Present Invention is Applied FIG. 7 is a sequence diagram illustrating the operation on radio channel control in yet another mobile communication system to which the present invention is applied.

The sequence illustrated by way of example in FIG. 7 is similar to the radio channel control that has been described above with reference to FIGS. 5 and 6, in that the connection utilizing a use-prohibited cell is prohibited and the mobile station is guided to the connection utilizing the effectively-operating cell different from the use-prohibited cell. However, the sequence of FIG. 7 differs from the radio channel controls shown in FIGS. 5 and 6 in that a cell is operated as an effectively-operating cell in a mobile communication system, which is different from the mobile communication system in which the use-prohibited cell is used.

In the drawing, RNC of the block "RNC/BTS" stands for Radio Network Controller which is a base transceiver station controller, whereas BTS stands for Base Transceiver Station. RNC and BTS are collectively represented as "RNC/BTS" for the sake of simplification of the sequence diagram. It is to be noted therefore that "RNC/BTS" does not mean a device named "RNC/BTS". Each of the "RNC" and the "BTS" is a component of a system which complies with the 3G mobile phone type, for example.

In addition, "eNB" is an abbreviation of Evolved Node B which corresponds to the base transceiver station of the LTE system, which is a mobile communication system different from 3G mobile communication system.

When a handover trigger is issued from a user's mobile station to the "RNC/BTS" (Step S701), the "RNC/BTS" (its radio channel controller) discriminates whether or not the destination of the handover request according to the handover trigger corresponds to the base station of the use-prohibited cell under handover restriction.

When this discrimination result corresponds to the use-prohibited cell, the "RNC/BTS" (its radio channel controller) prohibits the connection utilizing the use-prohibited cell according to the request, and generates the information on the connection control (instruction information), for carrying out the handover to the base station of the effectively-operating cell covering the area which includes the current position of the mobile station within the area of the use-prohibited cell.

In FIG. 7, the radio channel control operation is based on the premise that such an effectively-operating cell is operated in the mobile communication system, which is different from of the system in which the cell is under handover restriction. In addition, a mobile station is based on the premise that a model corresponding to the different mobile communication systems is applied.

Accordingly, the "RNC/BTS" issues a handover request to the "eNB" operated in the corresponding mobile communication system (Step S702).

The "eNB" that has received the handover request in Step S702 controls the handover to a base transceiver station of a cell as an effectively-operating cell. The cell is operated in the mobile communication system, different from of the system where the cell is under handover restriction, and which covers the area including the current position of the mobile station within the use-prohibited cell (Step S703).

Accordingly, subsequent to Step S703, a response to the handover is returned from the "eNB" to the "RNC/BTS" (Step S704). Then, the "RNC/BTS" issues a handover instruction to the mobile station (Step S705).

The mobile station that has received the handover instruction in Step S705 returns a response to the handover instruction to the "eNB" (Step S706).

Thereby, the connection utilizing the use-prohibited cell is prevented and the connection utilizing the effectively-operating cell is achieved.

The example described with reference to FIG. 7 is a specific example of the further generalized technical concept according to one embodiment of the present invention, in which the mobile communication system used for the effectively-operating cell is different from that used for the use-prohibited cell. The technical concept according to one embodiment of the present invention includes various cases, including but not limited to, a case in which the use-prohibited cell is based on 3G system, whereas the effectively-operating cell is used in the LTE system, a case in which the use-prohibited cell is used in the 3G system, whereas the effectively-operating cell is used in the 2G system, a case in which the use-prohibited cell is used in the LTE system, whereas the effectively-operating cell is based on 3G system, and the like.

Figure 8:
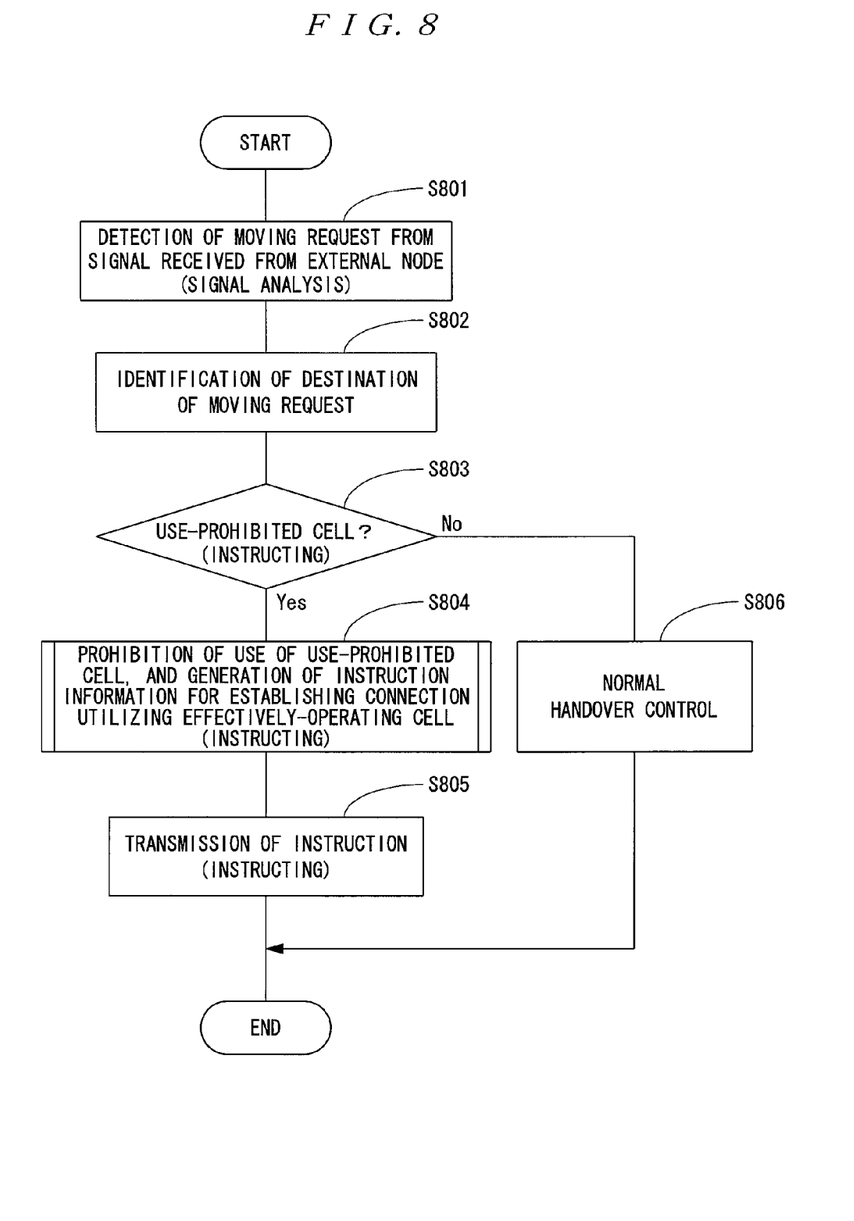
FIG. 8 is a flowchart illustrating a procedure of radio channel control according to one embodiment of the present invention.

Procedure of Radio Channel Control According to Embodiments of the Present Invention FIG. 8 is a flowchart illustrating a procedure of radio channel control according to one embodiment of the present invention.

First, a signal that has been received from an external node such as a user's mobile station is analyzed, and the received signal is detected when the received signal is a moving request from a moving source cell where the mobile station is currently positioned to a moving destination cell located in a destination of moving (Step S801: signal analysis).

Subsequently, the destination of the moving request according to the moving request detected in Step S801 is identified (Step S802). Then, it is discriminated whether or not the destination of the moving request identified in Step S802 is the use-prohibited cell (Step S803). When a result of the discrimination result is that the destination of the moving request is the use-prohibited cell (Step S803: Yes), the connection utilizing the use-prohibited cell is prohibited and the instruction information for establishing the connection utilizing the effectively-operating cell which covers an area including a current position of the mobile station within the use-prohibited cell is generated (Step S804: instructing).

Thereafter, the instruction information generated in Step S804 is sent to a corresponding destination of notification to which the connection is established by utilizing the effectively-operating cell (Step S805: instructing).

On the other hand, when it is discriminated that the destination of the moving request is not the use-prohibited cell (Step S803: No), the normal handover control is executed (Step S806).

In the flowchart illustrated in FIG. 8, a process in Step S804 may have various modes.

Figure 9:
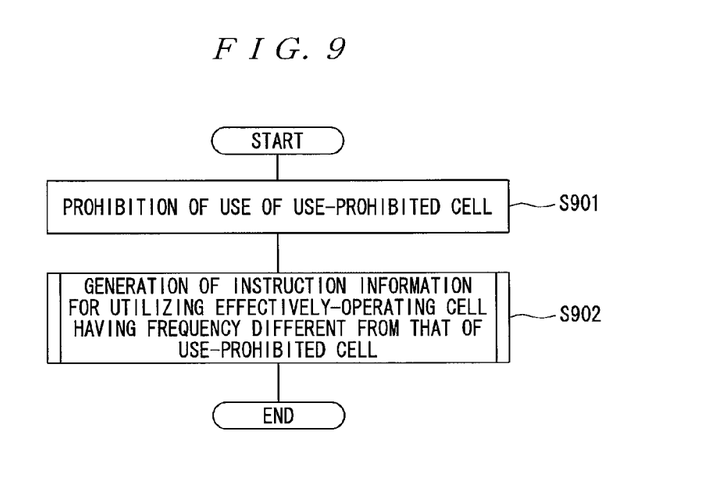
FIG. 9 is a flowchart illustrating one example of a procedure for generating instruction information in the flowchart of FIG. 8.

FIG. 9 is a flowchart illustrating one example of the procedure for generating the instruction information (Step S804) in the flowchart of FIG. 8.

First, the connection utilizing the use-prohibited cell is prohibited, which has already been described in Step S804 in the flowchart of FIG. 8 (Step S901).

Subsequently, the instruction information is generated for causing the mobile station to use a different frequency cell, as the effectively-operating cell, which has the frequency different from that of the use-prohibited cell, and which covers the area including the current position of the mobile station within the use-prohibited cell (Step S902).

For Step S902, two process procedures can be employed, to be described below with reference to FIGS. 10 and 11.

Figure 10:
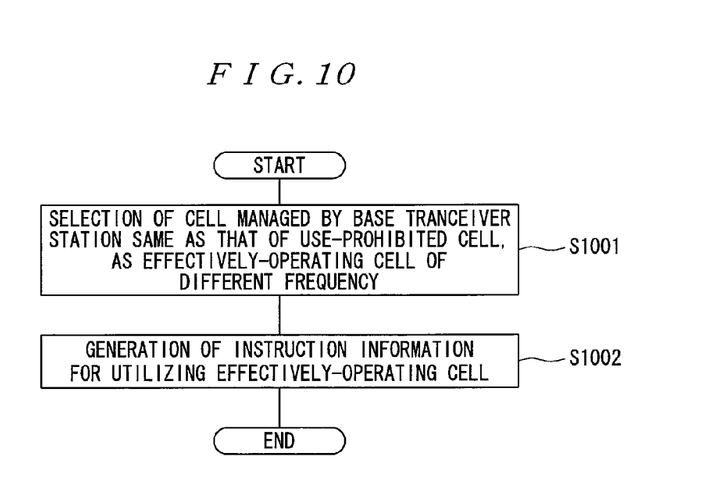
FIG. 10 is a flowchart illustrating one example of the procedure for generating the instruction information in the flowchart of FIG. 9.

FIG. 10 is a flowchart illustrating one example of the procedure for generating the instruction information in the flowchart of FIG. 9.

Referring to FIG. 10, an effectively-operating cell, which is covered by a base transceiver station identical to that having a use-prohibited cell, is selected as a cell for another frequency in Step S902 in FIG. 9 (Step S1001).

Subsequently, the instruction information, selected in Step S1001, for causing the mobile station to utilize the effectively-operating cell is generated (Step S1002).

Figure 11:
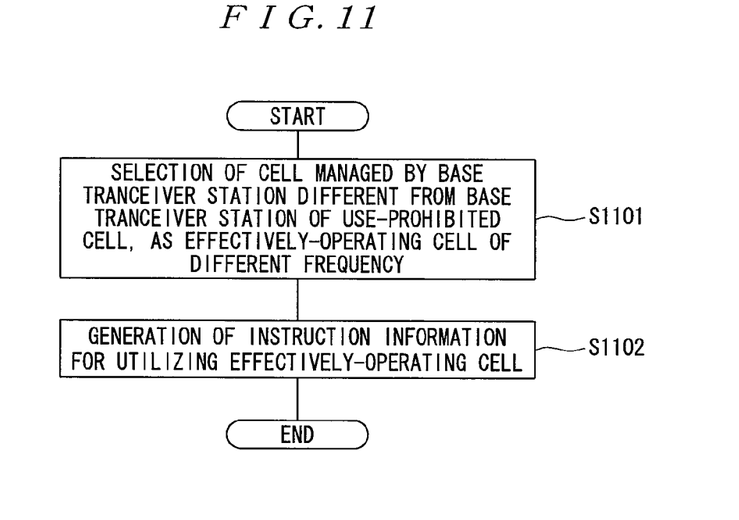
FIG. 11 is a flowchart illustrating another example of the procedure for generating the instruction information in the flowchart of FIG. 9.

FIG. 11 is a flowchart illustrating another example of the procedure for generating the instruction information in the flowchart of FIG. 9.

Referring to FIG. 11, the effectively-operating cell, which is covered by a base transceiver station different from a base transceiver station having the use-prohibited cell, is selected as another cell in Step S902 in FIG. 9 (Step S1101).

Subsequently, the instruction information for causing the mobile station to use the effectively-operating cell, selected in Step S1101, is generated (Step S1102).

Figure 12:
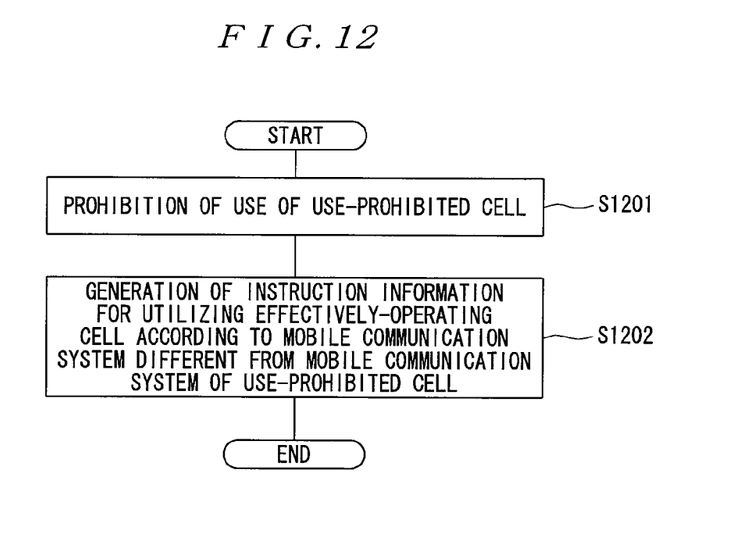
FIG. 12 is a flowchart illustrating another example of the procedure for generating the instruction information in the flowchart of FIG. 8.

FIG. 12 is a flowchart illustrating another example of the procedure for generating the instruction information in the flowchart of FIG. 8.

First, the connection utilizing the use-prohibited cell is prohibited, as already described in Step S804 in the flowchart of FIG. 8 (Step S1201).

Subsequently, the instruction information for causing the mobile station to utilize a cell as an effectively-operating cell is generated. This cell belongs to the mobile communication system different from that of the use-prohibited cell, and covers the area including the current position of the mobile station within the use-prohibited cell (Step S1202).

As described in the foregoing, according to one embodiment of the present invention, the use of the use-prohibited cell, such as a so-called "cell under construction", is prevented, and a channel utilizing the effectively-operating cell is connected in a mobile communication system. Therefore, one embodiment of the present invention is applicable for maintaining communication (connection) in a mobile station which moves in a course that enters a use-prohibited cell.

The present application is based on and claims priority from Japanese Patent Application No. 2007-289348, filed Nov. 7, 2007, the disclosure of which is hereby incorporated by reference herein in its entirety.

What is claimed is:

1. A radio channel controller, comprising:
a signal analyzing unit for analyzing whether or not a received signal from a mobile station during communication is a handover request of moving from a first cell where the mobile station is currently positioned to a second cell where the mobile station is going to move;
a management information retaining unit for retaining cell information including a use-prohibited cell and an effectively-operating cell, wherein the use-prohibited cell denotes that a connection of the handover request from the mobile station used by a general user for communication is prohibited and a connection from a mobile communication carrier for maintenance or from another mobile station, for maintenance, of a predefined operator serving for the mobile communication carrier is permitted, whereas the effectively-operating cell denotes that the connection of the handover request from the mobile station used by the general user for communication is permitted;
a determination unit for identifying the second cell to be identified by the handover request in accordance with the handover request analyzed by the signal analyzing unit to determine whether the second cell is the use-prohibited cell by referring to the cell information retained in the management information retaining unit; and
an instructing unit for transmitting to a base transceiver station an instruction of causing the mobile station to use the effectively-operating cell that covers an area including a current position of the mobile station from the effectively-operating cells of the cell information retained in the management information retaining unit, when the determination unit determines that the second cell is the use-prohibited cell,
whereby even after the mobile station during communication moves into the second cell that is determined by the determination unit to be the use-prohibited cell, while a connection to the use-prohibited cell is prohibited, the communication is continuously maintained before and after the mobile station moves into the second cell by use of the effectively-operating cell in accordance with the instruction of the instructing unit.

2. The radio channel controller according to claim 1,
wherein the instructing unit selects, as the effectively-operating cell, another cell having another frequency different from a frequency of the use-prohibited cell, after the mobile station moved to the second cell that the determination unit determines to be the use-prohibited cell, and
wherein the instructing unit transmits to the base transceiver station the instruction of causing the mobile station to use the effectively-operating cell having the another frequency cell as the second cell.

3. The radio channel controller according to claim 1,
wherein the instructing unit selects, as the effectively-operating cell, another cell which belongs to another mobile communication system different from a mobile communication system of the use-prohibited cell, after the mobile station moved to the second cell that is determined by the determination unit to be the use-prohibited cell, and
wherein the instructing unit transmits to the base transceiver station the instruction of causing the mobile station to use the effectively-operating cell of the another mobile communication system as the second cell.

4. A radio channel controlling method, comprising:
analyzing whether or not a received signal from a mobile station during communication is a handover request of moving from a first cell where the mobile station is currently positioned to a second cell where the mobile station is going to move;
retaining cell information including a use-prohibited cell and an effectively-operating cell, wherein the use-prohibited cell denotes that a connection of the handover request from the mobile station used by a general user for communication is prohibited and a connection from a mobile communication carrier for maintenance or from another mobile station, for maintenance, of a predefined operator serving for the mobile communication carrier is permitted, whereas the effectively-operating cell denotes that the connection of the handover request from the mobile station used by the general user for communication is permitted;
identifying the second cell to be identified by the handover request in accordance with the handover request analyzed by the analyzing step to determine whether the second cell is the use-prohibited cell by referring to the cell information retained in the retaining step; and
transmitting to a base transceiver station an instruction of causing the mobile station to use the effectively-operating cell that covers an area including a current position of the mobile station from the effectively-operating cells of the cell information retained in the retaining step, when the determining step determines that the second cell is the use-prohibited cell,
whereby even after the mobile station during communication moves into the second cell that is determined in the determining step to be the use-prohibited cell, while a connection to the use-prohibited cell is prohibited, the communication is continuously maintained before and after the mobile station moves into the second cell by use of the effectively-operating cell in accordance with the instruction in the transmitting step.

* * * * *